United States Patent
Kanai et al.

(10) Patent No.: US 6,875,485 B2
(45) Date of Patent: Apr. 5, 2005

(54) RESIN COMPOSITION FOR HEAT-SHRINKABLE POLYPROPYLENE SHRINK LABEL AND FILM COMPRISING SAME

(75) Inventors: Gen Kanai, Mie (JP); Takao Tayano, Mie (JP); Tadashi Sezume, Mie (JP)

(73) Assignee: Japan Polychem Corporation, Tokyo (JP)

( * ) Notice: Subject to any disclaimer, the term of this patent is extended or adjusted under 35 U.S.C. 154(b) by 0 days.

(21) Appl. No.: 09/927,442

(22) Filed: Aug. 13, 2001

(65) Prior Publication Data

US 2002/0064611 A1 May 30, 2002

(30) Foreign Application Priority Data

| Aug. 11, 2000 | (JP) | P.2000-243773 |
| Jan. 12, 2001 | (JP) | P.2001-004497 |
| Feb. 15, 2001 | (JP) | P.2001-038462 |

(51) Int. Cl.$^7$ ............................................. B32B 27/00
(52) U.S. Cl. .................... 428/34.1; 428/34.9; 428/35.7; 428/35.9
(58) Field of Search ............................. 428/34.9, 35.7, 428/35.9, 34.1

(56) References Cited

U.S. PATENT DOCUMENTS 4,645,791 A   2/1987  Theodore et al.
5,079,273 A * 1/1992  Kuroda et al. .............. 521/139
5,807,946 A   9/1998  Jourdain et al.

FOREIGN PATENT DOCUMENTS

| EP | 0 315 363 A2 | 5/1989 |
| EP | 0 327 755 A2 | 8/1989 |
| EP | 0 409 542 A2 | 1/1991 |
| GB | 2204048 | * 11/1988 |
| JP | A 62-62846 | 3/1987 |

OTHER PUBLICATIONS

Partial European Search Report dated Nov. 29, 2001.

Patent Abstracts of Japan—62062846 (Mar. 19, 1987).

European Search Report dated Apr. 4, 2002.

* cited by examiner

*Primary Examiner*—Harold Pyon
*Assistant Examiner*—Marc Patterson
(74) *Attorney, Agent, or Firm*—Sughrue Mion, PLLC

(57) ABSTRACT

A resin composition for heat-shrinkable polypropylene shrink label, comprises: from 50 to 95% by weight of a crystalline propylene-α-olefin random copolymer mainly comprising propylene and from 5 to 50% by weight of an alicyclic hydrocarbon resin having a softening temperature of not lower than 110 degrees Celsius.

12 Claims, No Drawings

RESIN COMPOSITION FOR HEAT-SHRINKABLE POLYPROPYLENE SHRINK LABEL AND FILM COMPRISING SAME

BACKGROUND OF THE INVENTION

1. Field of the Invention

The present invention relates to a resin composition for heat-shrinkable polypropylene-based shrink label (hereinafter sometimes simply referred to as heat-shrinkable propylene shrink label), a film for heat-shrinkable polypropylene-based shrink label, a laminated film for heat-shrinkable polypropylene-based shrink label, and a container having the film or laminated film attached thereto, and more particularly to a resin composition for heat-shrinkable polypropylene-based shrink label having an improved heat-shrinkability, particularly at low temperatures, a film or laminated film using the resin composition, and a container having the film or laminated film attached thereto.

2. Description of the Related Art

In recent years, shrink labels have been widely used for the purpose of sheathing wrapped articles to improve their external appearance, wrapping articles to avoid direct impact of their contents, tightly wrapping articles, label-wrapping glass bottle or plastic bottle to protect the material and display.

Known examples of plastic materials to be used for these purposes include polyvinyl chloride, polystyrene, polyethylene terephthalate, and polypropylene. A polyvinyl chloride label exhibits an excellent heat-shrinkability but is disadvantageous in that when combusted, it produces chlorine gas, which pollutes environment. A polystyrene or polyethylene terephthalate label exhibits a good heat-shrinkability but is disadvantageous in that it differs little in specific gravity from polyethylene terephthalate bottle (hereinafter referred to as "PET bottle") and thus can hardly be separated from PET bottle by suspension, preventing the recycling of PET bottle. Further, such a plastic label is made of a resin having a poor heat resistance to have a sufficient heat-shrinkability. Thus, when retorted, the plastic label is subject to resin melting that causes the printing ink to flow out.

A polypropylene differs greatly in specific gravity from PET bottle and thus can be easily separated from PET bottle by suspension and exhibits an excellent heat resistance but leaves something to be desired in heat-shrinkability. As approaches for improving low temperature shrinkability there are known a method involving the addition of propylene-butene-1 copolymer to the polypropylene and a method involving the addition of a petroleum resin or terpene resin to the polypropylene (JP-A-62-62846 (The term "JP-A" as used herein means an "unexamined published Japanese patent application")). However, these methods leave something to be desired in their effect. Thus, it has been desired to further improve the shrinkability of polypropylene-based resin as a base.

Further, the foregoing resin composition having a petroleum resin incorporated therein is disadvantageous in that an unstretched sheet which has been extruded during the formation of a film, particularly during the extrusion of unstretched sheet, can be easily stuck to the cooling roll, deteriorating the formability of the sheet. If a polypropylene-based resin free of petroleum resin is laminated on the unstretched sheet as a surface layer to improve the formability thereof, it is disadvantageous in that the heat-shrinkability is deteriorated because the interlayer has an insufficient heat-shrinkability. In order to solve the foregoing problem, it has been desired to provide an interlayer which exhibits an excellent heat-shrinkability.

No films for polypropylene-based shrink label having a satisfactory balance of the foregoing low temperature shrinkability, transparency, blocking resistance and slipperiness have ever been found. Further, as its heat-shrinkability increases, the conventional polypropylene-based shrink labels exhibit a raised specific gravity that deteriorates the efficiency in suspension separation from PET bottle by water. Thus, it has been keenly desired to provide a film for polypropylene-based shrink label having a low specific gravity and an improved heat-shrinkability.

SUMMARY OF THE INVENTION

Under these circumstances, an object of the invention is to provide a resin composition for polypropylene-based shrink label having an improved heat-shrinkability, particularly at low temperatures, an improved balance between shrink-wrapping properties and recycling efficiency provided by the reduction of specific gravity and well-balanced transparency, blocking resistance and slipperiness, a film or laminated film made of the resin composition, and a container such as PET bottle and polyolefin bottle having the laminated film attached thereto.

The inventors made studies of solution to the foregoing problems. As a result, it was found that the arrangement of a laminated film comprising an interlayer made of a resin composition comprising a specific crystalline propylene-$\alpha$-olefin random copolymer and a specific alicyclic hydrocarbon resin and a surface layer made of a resin composition comprising a specific crystalline propylene-$\alpha$-olefin random copolymer and a specific anti-blocking agent makes it possible to obtain a laminated film for heat-shrinkable polypropylene-based shrink label which can solve the foregoing problems. The present invention has thus been worked out.

The inventors made studies of solution to the foregoing problems. As a result, it was found that the use of a resin composition comprising a specific crystalline propylene-$\alpha$-olefin random copolymer and a specific alicyclic hydrocarbon resin blended at a specific ratio, or the use of a resin composition containing 50% by weight or more of a crystalline polypropylene and having a specific physical property makes it possible to obtain a film for heat-shrinkable polypropylene-based shrink label having an improved low temperature shrinkability. The present invention has thus been worked out.

The present invention provides a resin composition for heat-shrinkable polypropylene-based shrink label comprising: from 50 to 95% by weight of a crystalline propylene-$\alpha$-olefin random copolymer mainly comprising propylene, the copolymer satisfying the following requirements (1) to (3); and from 5 to 50% by weight of an alicyclic hydrocarbon resin having a softening temperature of not lower than 110° C.:

Requirement (1): The copolymer exhibits a melt flow rate of from 0.5 to 10 g/10 min at a temperature of 230° C. and a load of 2.16 kg;

Requirement (2): The copolymer exhibits a main fusion peak temperature (Tp) of from 100° C. to 140° C. as determined by means of a differential scanning calorimeter (DSC); and Requirement (3): The copolymer exhibits $T_{50}$ of not higher than 125° C. with the proviso that $T_{50}$ is the temperature (° C.) at which the amount of heat of fusion calculated from the low temperature side is 50% of $\Delta Hm$ supposing that ΔHm is the total amount of heat of fusion of the copolymer as determined by DSC.

In accordance with a first aspect of the present invention, a resin composition for heat-shrinkable polypropylene-based shrink label is provided wherein at least one of the peaks of loss tangent (tan δ) of the resin composition measured at a frequency of 1 Hz and a strain of 0.1% is observed at a temperature of from 30° C. to 100° C. in the measurement of dynamic viscoelasticity and the peak value is not smaller than 0.10.

In accordance with a fourth aspect of the present invention, the foregoing resin composition is used to provide a film for heat-shrinkable polypropylene-based shrink label which has been stretched at least monoaxially at a draw ratio of not smaller than 2.

DETAILED DESCRIPTION OF THE INVENTION

The resin composition for heat-shrinkable polypropylene-based shrink label according to the invention and the film made of the resin composition will be further described hereinafter.

[I] Resin Composition
1. Crystalline Propylene-α-olefin Random Copolymer
(1) Requirement (1): Melt Flow Rate (Hereinafter Referred to as "MFR")

The crystalline propylene-α-olefin random copolymer to be used in the invention exhibits MFR (230° C., 2.16 kg load) of from 0.5 to 10 g/10 min, preferably from 1.0 to 10 g/10 min. When MFR falls below 0.5 g/10 min, the resulting resin composition exhibits a deteriorated extrudability, occasionally lowering the productivity. On the contrary, when MFR exceeds 10 g/10 min, the resulting resin composition exhibits a deteriorated shrinkability and causes unevenness in thickness.

(2) Requirement (2): Main Fusion Peak Temperature (Tp) Determined by DSC

The main fusion peak temperature (Tp) of the crystalline propylene-α-olefin random copolymer of the invention determined by DSC is from 100° C. to 140° C., preferably from 100° C. to 130° C., more preferably from 100° C. to 125° C.

When the fusion peak temperature (Tp) is lower than 100° C., the resulting unstretched sheet can hardly be cooled and solidified, making it difficult to form a film. On the contrary, when the fusion peak temperature (Tp) is higher than 140° C., the resulting resin composition exhibits an insufficient shrinkability.

(3) Requirement (3): Relationship Between Amount of Heat of Fusion and Temperature The crystalline propylene-α-olefin random copolymer to be used in the invention needs to satisfy the following relationship:

$$T_{50} \leq 125° C.$$

(wherein $T_{50}$ is the temperature (° C.) at which the amount of heat of fusion calculated from the low temperature side is 50% of ΔHm supposing that ΔHm is the total amount of heat of fusion of the crystalline propylene-α-olefin random copolymer as determined by DSC).

$T_{50}$ is not higher than 125° C., preferably 120° C., more preferably 115° C. When $T_{50}$ is higher than 125° C., the resulting resin composition exhibits a deteriorated shrinkability.

(4) Constituents of Crystalline Propylene-α-olefin Random Copolymer

Examples of the α-olefin to be random-copolymerized with the propylene in the crystalline propylene-α-olefin random copolymer to be used in the invention include ethylene, and $C_4$–$C_{20}$ α-olefin. Preferably, ethylene, butene-1, hexene-1, octene-1, etc. are used. Particularly preferred among these α-olefins is ethylene.

The crystalline propylene-α-olefin random copolymer of the invention is not limited so far as it satisfies the foregoing requirements (1) to (3). In practice, however, the content of α-olefin in the random copolymer is from about 2.0 to 30% by weight. In particular, the content of α-olefin, if it is ethylene, is from about 2.0 to 10% by weight, preferably from about 2.0 to 6.0% by weight. Two or more of crystalline propylene-α-olefin random copolymers may be used in admixture so far as they satisfy the foregoing requirements (1) to (3).

(5) Process for the Preparation of Crystalline Propylene-α-olefin Random Copolymer The preparation of the crystalline propylene-α-olefin random copolymer to be used in the invention is preferably accomplished by polymerization in the presence of a metallocene catalyst, preferably by the random copolymerization of propylene with ethylene or $C_4$–$C_{20}$ α-olefin in the presence of a metallocene catalyst comprising the following catalyst components (A) and (B) and optionally the following component (C).

(a) Metallocene Catalyst

The catalyst component (A) is represented by the following general formula:

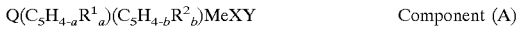
Component (A)

$(C_5H_{4-a}R^1_a)$ and $C_5H_{4-b}R^2_b$ each represent a conjugated 5-membered ligand. Q represents a connecting group which crosslinks the two conjugated 5-membered ligands $C_5H_{4-a}R^1_a$ and $C_5H_{4-b}R^2_b$. Specific examples of the connecting group include (a) $C_1$–$C_{20}$, preferably $C_1$–$C_6$ alkylene group, (b) silylene group having $C_1$–$C_{20}$, preferably $C_1$–$C_{12}$ hydrocarbon group, and (c) germylene group having $C_1$–$C_{20}$, preferably $C_1$–$C_{12}$ hydrocarbon group. Particularly preferred among these groups are alkylene group, and silylene group. Me represents zirconium or hafnium. X and Y each independently represent a hydrogen atom, halogen, $C_1$–$C_{20}$ hydrocarbon group, $C_1$–$C_{20}$ alkoxy group, $C_1$–$C_{20}$ alkylamide group, trifluoromethanesulfonic acid group, $C_1$–$C_{20}$ phosphorus-containing hydrocarbon group or $C_1$–$C_{20}$ silicon-containing hydrocarbon group. $R^1$ and $R^2$ each are a substituent on the conjugated 5-membered ligand and each independently represent a $C_1$–$C_{20}$ hydrocarbon group, halogen, alkoxy group, silicon-containing hydrocarbon group, phosphorus-containing hydrocarbon group, nitrogen-containing hydrocarbon group or boron-containing hydrocarbon group. Two adjacent $R^1$'s or $R^2$'s may be connected to each other to form a ring. The prefixes a and b are integers satisfying the relationships $0 \leq a \leq 4$ and $0 \leq b \leq 4$, respectively. However, the two 5-membered ligands having $R^1$ and $R^2$, respectively, are asymmetrical about the plane including Me from the standpoint of relative position with respect to Q.)

Nonrestrictive examples of the foregoing metallocene catalyst include the following compounds. These compounds are designated merely by chemical nomenclature. However, it goes without saying that the stereostructure of these compounds have asymmetry as defined herein.

(1) Dimethylsilylene bis{1-(2-methyl-4-phenyl-4H-azulenyl)}zirconium dichloride, (2) dimethylsilylene bis[1-

{2-methyl-4-(4-chlorophenyl)-4H-azulenyl}]zirconium dichloride, (3) dimethylsilylene bis[1-{2-methyl-4-(4-fluorophenyl)-4H-azulenyl}]zirconium dichloride, (4) dimethylsilylene bis[1-{2-methyl-4-(3-chlorophenyl)-4H-azulenyl-4H-azulenyl}]zirconium dichloride, (5) dimethylsilylene bis[1-{2-methyl-4-(4-methylphenyl)-4-4H-azulenyl}]zirconium dichloride, (6) dimethylsilylene bis[1-{2-methyl-4-(1-naphthyl)-4H-azulenyl}]zirconium dichloride, (7) dimethylsilylene bis[1-{2-methyl-4-(2-naphthyl)-4H-azulenyl}]zirconium dichloride, (8) dimethylsilylene bis[1-{2-methyl-4-(4-t-4-(4-butylphenyl)-4H-azulenyl}]zirconium dichloride, (9) dimethylsilylene bis[1-{2-methyl-4-(4-fluoro-1-naphthyl)-4H-azulenyl}]zirconium dichloride, (10) dimethylsilylene bis[1-{2-methyl-4-(4-fluoro-2-naphthyl)-4H-azulenyl}]zirconium dichloride, (11) dimethylsilylene bis[1-{2-ethyl-4-phenyl-4H-azulenyl}]zirconium dichloride, (12) dimethylsilylene bis[1-{2-ethyl-4-(4-chlorophenyl)-4H-azulenyl}]zirconium dichloride, (13) dimethylsilylene bis[1-{2-ethyl-4-(4-fluorophenyl)-4H-azulenyl}]zirconium dichloride, (14) dimethylsilylene bis[1-{2-ethyl-4-(2-methylphenyl)-4H-azulenyl}]zirconium dichloride, (15) dimethylsilylene bis[1-{2-ethyl-4-(1-napthyl)-4H-azulenyl}]zirconium dichloride, (16) dimethylsilylene bis[1-{2-ethyl-4-(1-anthracenyl)-4H-azulenyl}] zirconium dichloride, (17) dimethylsilylene bis[1-{2-ethyl-4-(1-phenanthryl)-4H-azulenyl}]zirconium dichloride, (18) dimethylsilylene bis[1-(2-dimethylborano-4-indolyl-4H-azulenyl}]zirconium dichloride, (19) dimethylsilylene bis{1-methyl-4-phenylindenyl)}zirconium dichloride, etc.

Catalyst Component (B)

In the present invention, as the component (B) there is preferably used one selected from the group consisting of (b-1) to (b-4).
(b-1) Aluminum oxy compound;
(b-2) Particulate carrier having an ionic compound or Lewis acid supported thereon which can react with the component (A) to convert the component (A) to cation;
(b-3) Particulate solid acid;
(b-1) Aluminum oxy compound:

Examples of the aluminum oxy compound employable herein include alumoxane such as methyl alumoxane and methyl isobutylalumoxane.

The aluminum oxy compound may be supported on a particulate carrier.

As the particulate carrier there may be exemplified a particulate carrier made of an inorganic or organic compound. Examples of the inorganic carrier employable herein include silica, alumina, silica-alumina, magnesium chloride, activated charcoal, and inorganic silicate. These compounds may be used in admixture.

As the organic carrier there may be used a particulate carrier made of a porous polymer formed by a $C_2$–$C_{14}$ α-olefin polymer such as ethylene, propylene, 1-butene and 4-methyl-1-pentene, polymer of aromatic unsaturated hydrocarbon such as styrene and divinylbenzene or the like. These compounds may be used in admixture.

(b-2) Particulate carrier having an ionic compound or Lewis acid supported thereon which can react with the component (A) to convert the component (A) to cation:

As the ionic compound which can react with the component (A) to convert the component (A) to a cation there may be used a complex of cation such as carbonium cation and ammonium cation with cation of organic boron compound such as tris(3,5-difluorophenyl)boron and tris (pentafluorophenyl)boron.

As Lewis acid, particularly Lewis acid which can convert the component (A) to a cation, there may be used any organic boron compound such as tris(pentafluorophenyl) boron or metal halide such as aluminum chloride and magnesium chloride.

As the particulate carrier there may be properly used any of the foregoing compounds.
(b-3) Solid Acid:

Examples of the solid acid employable herein include alumina, and alumina-silica.
(b-4) Ion-exchangeable Laminar Silicate:

As the component (b-4) there may be used an ion-exchangeable laminar silicate. The ion-exchangeable laminar silicate indicates a silicate compound having a crystal structure comprising a laminate of planes of ionic bond which are weakly bonded to each other, ions contained therein being exchangeable. Preferred examples of the ion-exchangeable laminar silicate include scumetites such as monmorillonite, sauconite, beidellite, nontronite, saponite, hectorite and stevensite, vermiculites such as vermiculite, and micas such as mica, illite, sericite and glauconite.

The component (B) may be used untreated. However, the component (B) is preferably subjected to treatment with salt, acid, alkali or organic material or chemical treatment before use. As the chemical treatment there maybe used any of surface treatment involving the removal of impurities from the surface of the component (B) and treatment having an effect on the structure of clay.

A particularly preferred example of the component (b-4) is an ion-exchangeable laminar silicate having a water content of not greater than 1% by weight obtained by treatment with salt and/or acid.

As the component B there is preferably used the component (b-4).

Catalyst Component (C)

The component (C) is an organic aluminum compound. The organic aluminum compound to be used as the component (C) in the invention is preferably a compound represented by the general formula $(AlR^4{}_n X_{3-n})_m$. In this general formula, R4 represents a $C_1$–$C_{20}$ hydrocarbon group, and X represents a halogen, hydrogen, alkoxy group or amino group. The suffix n represents an integer of from 1 to 3, and the suffix m represents an integer of 1 or 2. Specific examples of the component (C) include trimethyl aluminum, triethyl aluminum, trinormalpropyl aluminum, trinormalbutyl aluminum, triisobutyl aluminum, trinormalhexyl aluminum, trinormaloctyl aluminum, trinormaldecyl aluminum, diethyl aluminum chloride, diethyl aluminum sesquichloride, diethyl aluminum hydride, diethyl aluminum ethoxide, diethyl aluminum dimethylamide, diisobutyl aluminum hydride, and diisobutyl aluminum chloride.

Formation of Catalyst

The preparation of the catalyst to be used in the preparation of the crystalline propylene-α-olefin random copolymer of the invention is accomplished by bringing a catalyst comprising the foregoing components (A) and (B) and optionally the component (C) into contact with each other inside or outside the polymerization tank in the presence or absence of the monomer to be polymerized.

Alternatively, the foregoing catalyst may be prepared by prepolymerization in the presence of an olefin. As the olefin to be used in prepolymerization there may be used propylene, ethylene, 1-butene, 3-methylbutene-1, styrene, divinylbenzene or the like. These olefins may be used in admixture with other olefins.

The ratio of the components (A), (B) and (C) to be used in the preparation of the foregoing catalyst is arbitrary.

Polymerization

The preparation of the crystalline propylene-α-olefin random copolymer to be used in the invention is carried out by mixing a catalyst comprising the components (A) and (B) and optionally the component (C) with propylene and ethylene or $C_4$–$C_{20}$ α-olefin so that they come in contact with each other. $T_p$ varies with the catalyst components to be combined or the polymerization conditions but can be adjusted by changing the type and amount of the α-olefin to be copolymerized.

The polymerization of the monomers may be accomplished by any process which allows efficient contact of the catalyst component with the various monomers. Specific examples of the polymerization process employable herein include slurry process with an inert solvent, bulk process substantially free from inert solvent but with propylene as a solvent, solution process, and gas phase process which comprises keeping the various monomers in gaseous state substantially free from liquid solvent.

The polymerization may be effected either continuously or batchwise.

Referring to the polymerization conditions, the polymerization temperature is from −78° C. to 160° C. and the polymerization pressure is from 0 to 90 kg/cm$^2$.G. During this polymerization process, hydrogen may be auxiliarily used as a molecular weight modifier.

2. Alicyclic Hydrocarbon Resin

Examples of the alicyclic hydrocarbon resin to be used in the invention include petroleum resin, terpene resin, rosin-based resin, coumarone and indene resin, and hydrogenated derivatives thereof. Among these alicyclic hydrocarbon resins, those free of polar group or those having a percent hydrogenation of not smaller than 95% are preferred. More preferably, a petroleum resin or a hydrogenated derivative thereof is used. Examples of such a petroleum resin include Alcon (produced by Arakawa Chemical Industries, Ltd.) and Escorez (produced by Tonex Co., Ltd.).

The foregoing alicyclic hydrocarbon resin needs to have a softening point of not lower than 110° C., preferably not lower than 115° C., more preferably not lower than 125° C.

When the softening point of the alicyclic hydrocarbon resin is lower than 110° C., the resulting film becomes sticky or becomes turbid with time.

3. Mixing Proportion of Resin Composition

The mixing proportion of crystalline propylene-α-olefin random copolymer and alicyclic hydrocarbon resin in the resin composition to be used in the invention are from 50 to 95% by weight, preferably from 60 to 90% by weight, and from 5 to 50% by weight, preferably from 10 to 40% by weight, respectively.

When the proportion of crystalline propylene-α-olefin random copolymer in the resin composition exceeds 95% by weight (i.e., when the proportion of alicyclic hydrocarbon resin falls below 5% by weight), the resulting resin composition exhibits a deteriorated shrinkability. On the contrary, when the proportion of crystalline propylene-α-olefin random copolymer in the resin composition falls below 50% by weight (i.e., when the proportion of alicyclic hydrocarbon resin exceeds 50% by weight), the resulting resin composition exhibits a deteriorated formability and the resulting film for label becomes sticky.

4. Other Components

The resin composition may further comprise an oxidation inhibitor, an antistat, a neutralizing agent, a nucleating agent, an anti-blocking agent, a slipping agent, etc. incorporated therein so far as the effect of the invention cannot be impaired.

The resin composition may further comprise a known shrinkability improving component such as propylene-butene-1 copolymer, polybutene-1 and linear low density polyethylene incorporated therein for the purpose of further improving shrinkability so far as the effect of the invention cannot be impaired.

The resin composition for shrink label of the invention preferably has at least one peak of loss tangent (tan δ) observed at a temperature of from 30° C. to 100° C. as measured at a frequency of 1 Hz and a strain of 0.1% during the measurement of dynamic viscoelasticity, and the peak value is preferably not smaller than 0.10.

When the foregoing peak temperature is lower than 30° C., heat-shrinkability and age shrinkability are ill-balanced. On the contrary, when the peak temperature is higher than 100° C., the resulting resin composition exhibits a deteriorated low temperature heat shrinkability. On the contrary, when the foregoing peak value falls below 0.1, the resulting resin composition exhibits a deteriorated heat shrinkability.

In the case where there are observed a plurality of peaks of tan δ in the foregoing measurement, at least one of the peaks is preferably observed at a temperature of from 30° C. to 100° C., and the peak value is preferably not smaller than 0.1.

[II] Film for Shrink Label

The film for heat-shrinkable polypropylene-based shrink label of the invention can be prepared by subjecting the foregoing polypropylene-based resin composition to a known forming method such as inflation method and flat-stretching method. In the invention, flat-stretching method is preferred, particularly tenter type monoaxial stretching method.

The polypropylene-based resin composition is melt-extruded by the foregoing forming method, and then stretched at least monoaxially at a draw ratio of not smaller than 2 by a known method to prepare a film for shrink label of the invention.

The stretching direction may be at least monoaxial. It is preferred that stretching be effected monoaxially only in the direction perpendicular to the direction of flow of label. When the draw ratio falls below 2, a sufficient shrinkability cannot be obtained.

For the purpose of enhancing shrinkability, stretching is preferably effected at a temperature as low as possible. In particular, when there is used a step of pre-heating the unstretched sheet, it is preferred that the pre-heating temperature be lowered as much as possible so far as formation is allowed from the standpoint of improvement of shrinkability.

The thickness of the film for shrink label of the invention is not specifically limited but is not greater than 100 μm, preferably from 30 μm to 80 μm.

Further, the film for shrink label of the invention may be used as a film for single-layer label or film for multi-layer label (two or more layers). The film for multi-layer label may comprise at least one film for label made of the resin composition of the invention.

The lamination of these layers can be carried out by multi-layer co-extrusion method or dry lamination method.

The laminated film for shrink label of the invention comprises a surface layer (II) laminated on one or both sides of an interlayer (I). The surface layer (II) comprises a resin composition comprising a crystalline propylene-α-olefin random copolymer (2) mainly comprising propylene satisfying the following requirements (d) and (e).

[III] Surface Layer (II) of Laminated Film for Shrink Label

1. Crystalline Propylene-α-olefin Random Copolymer (2)

(1) Requirement (d): MFR

The crystalline propylene-α-olefin random copolymer (2) to be used in the invention exhibits MFR (230° C., 2.16 kg load) of from 0.5 to 50 g/10 min, preferably from 1.0 to 20 g/10 min, more preferably from 1.0 to 10 g/10 min, particularly from 1.0 to 5.0 g/10 min. When MFR falls below 0.5 g/10 min, the resulting resin composition exhibits a deteriorated extrudability, occasionally lowering the productivity. On the contrary, when MFR exceeds 50 g/10 min, the resulting resin composition exhibits a deteriorated shrinkability and causes unevenness in thickness.

(2) Requirement (e): Main Fusion Peak Temperature (Tp) Determined by DSC

The main fusion peak temperature (Tp) of the crystalline propylene-α-olefin random copolymer (2) of the invention determined by DSC is from 100° C. to 150° C., preferably from 100° C. to 130° C., more preferably from 100° C. to 125° C.

When the fusion peak temperature (Tp) is lower than 100° C., the resulting unstretched sheet can hardly be cooled and solidified, making it difficult to form a film. On the contrary, when the fusion peak temperature (Tp) is higher than 150° C., the resulting resin composition shows a deteriorated external appearance and exhibits an insufficient shrinkability.

(3) Constituents of Crystalline Propylene-α-olefin Random Copolymer

Examples of the α-olefin to be random-copolymerized with the propylene in the crystalline propylene-α-olefin random copolymer (2) to be used in the invention include ethylene, and $C_4$–$C_{20}$ α-olefin. Preferably, ethylene, butene-1, hexene-1, octene-1, etc. are used. Particularly preferred among these α-olefins is ethylene.

The crystalline propylene-α-olefin random copolymer (2) of the invention is not limited so far as it satisfies the foregoing requirements (d) and (e). In practice, however, the content of α-olefin in the random copolymer is from about 2.0 to 30% by weight. In particular, the content of α-olefin, if it is ethylene, is from about 2.0 to 10% by weight, preferably from about 2.0 to 6.0% by weight. Two or more of crystalline propylene-α-olefin random copolymers may be used in admixture so far as they satisfy the foregoing requirements (d) and (e).

In the case where the surface layer (II) is laminated on both sides of the interlayer (I), the same or different crystalline propylene-α-olefin random copolymers may be used.

The merit of having the laminated structure in the film is as follows. Firstly, it tends to prevent the film from adhering to a cooling roll upon extrusion molding. Secondary, it gets possible to enhance transparency by adding an anti-blocking agent only to the surface layer without adding an anti-blocking agent to the interlayer.

(4) Process for the Preparation of Crystalline Propylene-α-olefin Random Copolymer (2)

The crystalline propylene-α-olefin random copolymer (2) to be used in the invention may be prepared by any method so far as it satisfies the foregoing requirements (d) and (e). Preferably, a crystalline propylene-α-olefin random copolymer prepared by polymerization in the presence of a metallocene catalyst as the foregoing crystalline propylene-α-olefin random copolymer (1) is used.

2. Anti-blocking Agent

The laminated film for shrink label of the invention preferably comprises an anti-blocking agent incorporated therein at least in one surface layer (II). The anti-blocking agent is not specifically limited. For example, any known anti-blocking agent such as silica, crosslinked polymethyl methacrylate, particulate silicone and calcium carbonate may be used.

The volume-average particle diameter of the anti-blocking agent is from 1.0 μm to 10 μm, preferably from 1.5 μm to 5.0 μm.

When the volume-average particle diameter of the blocking agent falls below 1.0 μm, the resulting film exhibits a good transparency but exhibits deteriorated blocking resistance and slipperiness. On the contrary, when the volume-average particle diameter of the blocking agent exceeds 10 μm, the resulting film exhibits a deteriorated transparency. Further, when the resulting label is subjected to printing, prints can be missed at some area. Moreover, the anti-blocking agent comes off from the film, producing white powder.

3. Other Components

The resin composition may further comprise an oxidation inhibitor, an antistat, a neutralizing agent, a nucleating agent, a slipping agent, etc. incorporated therein so far as the effect of the invention cannot be impaired.

The resin composition may further comprise a known shrinkability improving component such as propylene-butene-1 copolymer, polybutene-1 and linear low density polyethylene incorporated therein for the purpose of further improving shrinkability so far as the effect of the invention cannot be impaired.

Further, the addition of from 1 to 10 parts by weight of a maleic anhydride-modified polypropylene such as Umex 1001 (produced by Sanyo Chemical Industries, Ltd.) to 100 parts by weight of the crystalline propylene-α-olefin random copolymer (2) makes it possible to prevent the occurrence of voids due to anti-blocking agent during stretching and hence further improve transparency and prevent the anti-blocking agent from coming off to advantage.

4. Mixing Proportion

The proportion of the anti-blocking agent to be incorporated in the crystalline propylene-α-olefin random copolymer (2) to be used as the surface layer (II) of the laminated film for shrink label of the invention is from 0.05 to 1.0% by weight, preferably from 0.2 to 1.0% by weight, more preferably from 0.2 to 0.5% by weight based on the crystalline propylene-α-olefin random copolymer (2).

When the proportion of the anti-blocking agent in the composition falls below 0.05% by weight, the resulting film exhibits a good transparency but exhibits deteriorated blocking resistance and slipperiness. On the contrary, when the proportion of the anti-blocking agent in the composition exceeds 1.0% by weight, the resulting film exhibits a deteriorated transparency.

[IV] Method for Forming (Laminated) Film for Shrink Label

The laminated film for heat-shrinkable polypropylene-based shrink label of the invention maybe formed by laminating the foregoing interlayer (I) and surface layer (II). For the formation of laminated film, any known method such as melt co-extrusion method may be used.

The stretching of the film for shrink label or laminated film for shrink label can be carried out by any known method such as inflation method and flat-stretching method. In the invention, flat-stretching method is preferred, particularly tenter type monoaxial stretching method.

The resin compositions are melt (co)-extruded by the foregoing forming method, and then stretched at least monoaxially at a draw ratio of not smaller than 2, preferably not smaller than 4 by a known method to prepare a (laminated) film for shrink label of the invention. The stretching direction may be at least monoaxial. It is preferred that stretching be effected monoaxially only in the direction perpendicular to the direction of flow of film. When the draw ratio falls below 2, a sufficient shrinkability cannot be obtained.

For the purpose of enhancing shrinkability, stretching is preferably effected at a temperature as low as possible. In particular, when there is used a step of pre-heating the unstretched sheet, it is preferred that the pre-heating temperature be lowered as much as possible so far as formation is allowed.

Further, the (laminated) film for shrink label of the invention may be coated with various coating materials on the surface thereof after or during formation for the purpose of improving adhesion and providing gas barrier properties. The coating, if effected during formation, is preferably effected between the sheet-forming step and the stretching step (between first stage stretching step and second stage stretching step in the case of successive biaxial stretching).

For the purpose of enhancing the adhesive strength between the various coating materials and the (laminated) film for shrink label, the (laminated) film for shrink label of the invention is preferably subjected to a known surface treatment such as corona discharge treatment, flame treatment and plasma treatment at least on one side thereof.

[V] (Laminated) Film for Shrink Label

The thickness of the (laminated) film for shrink label of the invention is not specifically limited but is not greater than 100 μm, preferably from 30 μm to 80 μm.

In the laminated film for shrink label of the invention, the sum of the thickness of the surface layers (II) is from 1 to 50%, preferably from 3% to 30%, more preferably from 5% to 10% of the total thickness of the laminated film.

When the sum of the thickness of the surface layers (II) exceeds 50% of the total thickness of the laminated film, the resulting laminated film exhibits deterioration in shrinkability, particularly low temperature shrinkability. On the contrary, when the sum of the thickness of the surface layers (II) falls below 1% of the total thickness of the laminated film, the unstretched sheet which has been extruded can be easily stuck to the cooling roll, deteriorating formability.

The specific gravity of the (laminated) film for shrink label of the invention is not greater than 0.94. If the specific gravity of the (laminated) film for shrink label exceeds 0.94, the specific gravity increases when the film is subjected to secondary processing such as printing, lowering the efficiency of suspension separation from PET bottle by water.

The (laminated) film for shrink label of the invention shrinks in the main shrinking direction at a shrinkage rate of less than 3%, preferably less than 2%, more preferably less than 1%, at a temperature of 40° C. in 7 days. When the percent shrinkage in the main shrinking direction is not smaller than 3%, the resulting film can easily shrink during its transportation and storage, tightening the coiled product or causing waviness. The resulting product has a remarkably deteriorated commercial value.

The shrinkage rate and specific gravity of the (laminated) film for shrink label of the invention satisfy the following relationships (1) to (3):

$S_{80} > 251d - 215$  Relationship (1):

$S_{90} > 531d - 462$  Relationship (2):

$S_{100} > 627d - 541$  Relationship (3):

(wherein $S_{80}$, $S_{90}$ and $S_{100}$ are shrinkage rate (%) in the main shrinking direction determined when dipped in a hot water bath at 80° C., 90° C. and 100° C., respectively, for 10 seconds; and d is the specific gravity of the laminated film for shrink label).

Those which don't satisfy the foregoing relationships (1) to (3) have ill-balanced shrinkage rate and specific gravity and exhibit deterioration in either wrapping properties or recyclability.

[VI] Heat-shrinkable Shrink Label

The heat-shrinkable shrink label of the invention is obtained by forming the foregoing (laminated) film for shrink label into cylinder.

The forming method is not specifically limited. Any known forming method may be used. For example, a flat (laminated) film for shrink label can be subjected to center sealing in such a manner that the main shrinking direction of film corresponds to circumferential direction to obtain a shrink label. The center sealing can be carried out by sealing involving the application of an organic solvent, sealing involving the application of an adhesive, heat sealing or the like, but the present invention is not limited thereto.

The formation of the (laminated) film for shrink label into cylinder may be preceded by printing.

Since the heat-shrinkable shrink label obtained from the (laminated) film for shrink label of the invention has a specific gravity of less than 1.0 even after subjected to secondary processing such as printing, it can make contribution to the reduction of the weight of various containers and can be separated from PET bottle by suspension in water. Further, since the heat-shrinkable shrink label of the invention exhibits an excellent shrinkability, particularly at low temperatures, as compared with conventional polypropylene-based shrink labels, it shows excellent shrink-wrapping properties and can wrap containers with a beautiful external appearance.

[VII] Container Having Heat-shrinkable Shrink Label Attached Thereto

By attaching the heat-shrinkable shrink label of the invention to various containers and then heating the shrink label so that it shrinks, containers having a heat-shrinkable shrink label attached thereto can be obtained.

The container to which the heat-shrinkable shrink label of the invention can be attached is not specifically limited. In practice, however, heat-shrinkable shrink label of the invention can be attached to PET bottle, polyproplylene bottle, bottle, lunch box, etc.

Further, the film for shrink label of the invention may be used as a film for single-layer label or film for multi-layer label (two or more layers). The film for multi-layer label may comprise at least one film for label made of the resin composition of the invention.

The lamination of these layers can be carried out by multi-layer co-extrusion method or dry lamination method.

EXAMPLES

The present invention will be further described in the following examples, but the present invention should not be construed as being limited thereto. The evaluation method and the process for the preparation of film for label used in the following examples and comparative examples will be described hereinafter.

(1) MFR: MFR was measured according to JIS K-6758 (conditions: 230° C.; load of 2.16 kg).

(2) $T_p$ and $T_{50}$: Using a differential scanning calorimeter (DSC) produced by SEIKO CROP., 5.0 mg of a sample (crystalline propylene-α-olefin random copolymer) was measured out, kept at a temperature of 200° C. for 5 minutes, cooled to a temperature of 40° C. at a rate of 10° C./min, and then heated at a rate of 10° C./min so that it was fused. A curve of amount of heat of fusion was then obtained. $T_p$ and $T_{50}$ were then determined from the curve of amount of heat of fusion.

(3) Softening Temperature: The softening temperature was measured according to JIS K-2207.

(4) Heat-shrinkage Rate: A stretched film was subjected to aging at a temperature of 40° C. for 24 hours, cut into a square having a size of 10 cm×10 cm one of the sides of which is parallel to the direction of flow of film, and then dipped in a water bath which had been heated to a predetermined temperature for 10 seconds. After 10 seconds, the sample was immediately dipped in a 23° C. water bath which had been separately prepared for 20 seconds, and then measured for length in the direction of flow of film and in the crossing direction to determine heat shrinkage rate.

(5) Stickiness of Film:

A stretched film was cut into a square having a size of 10 cm×10 cm. 20 sheets of such a square film were then laminated. The laminate was then clamped between two sheets of a glass plate having a size of 10 cm×10 cm. The laminate was then allowed to stand in an atmosphere of 23° C. and 50% RH with a 2 kg weight put thereon for 24 hours. The weight was then removed. The 20 sheets of film were then peeled off one by one to evaluate stickiness. When the sheets were easily peeled off from each other, the film was considered nonstick. On the contrary, when the sheets were hardly peeled off from each other, the film was considered sticky.

(6) Method for the Formation of Film for Label (i) Method for the Formation of Unstretched Sheet The resin composition was melt-extruded through a T-die at a temperature of 200° C., and then cooled and solidified over a 30° C. cooling roll to obtain an unstretched sheet having a thickness of 300 μm.

(ii) Method for the Formation of Stretched Film

The unstretched sheet thus obtained was introduced into a tenter furnace where it was then pre-heated to a lowest forming temperature for 30 seconds. At the same temperature, the sheet was then stretched crosswise at a draw ratio of 6.5 in 30 seconds. Subsequently, the sheet was annealed at a temperature of 85° C. in the same tenter furnace while being relaxed crosswise at a ratio of 7.5% for 30 seconds to obtain a film for heat-shrinkable shrink label having a draw ratio of 6 and a thickness of 50 μm.

(7) Wrapping Properties:

The laminated film for shrink label was cut into a size having a length of 22.5 cm in the main shrinking direction and a length of 20 cm in the direction perpendicular to the main shrinking direction. The film thus cut was then coiled to a cylinder having a circumference of 21.5 cm in such an arrangement that the main shrinking direction corresponds to the circumferential direction. The film was then heat-sealed at the overlapped portion to obtain a cylindrical shrink label. A commercial PET bottle (500 ml, Supli, produced by Kirin Beverage Co., Ltd.) was then covered by this cylindrical shrink label with its lower end flush with one end of the shrink label. 500 ml of water (25° C.) was then put into the labeled PET bottle. The PET bottle was capped, and then dipped in a water bath which had been adjusted to a temperature of 90° C. for 5 seconds. After 5 seconds, the PET bottle was immediately withdrawn from the 90° C. water bath, and then dipped in a 25° C. water bath which had been separately prepared for 1 minute or more to effect label wrapping. The PET bottle thus label-wrapped was then examined for adhesion of label at a portion of 15.7 cm from the bottom of the PET bottle (upper end of label on commercial PET bottle; circumference: 18.0 cm; shrinkage rate: 16.3%). When the label was found to have been adhered completely to the PET bottle, wrapping properties were considered good. On the contrary, when the label was found to have been insufficiently adhered to the PET bottle, wrapping properties were considered poor.

(8) Specific Gravity: A sample label attached to PET bottle was measured for specific gravity by a density gradient tube method according to JIS K-7112.

(9) Separability:

A labeled PET bottle was cut into a square having a size of 10 cm×10 cm at the labeled portion. The square sample thus obtained was further cut into 100 squares having a size of 1 cm×1 cm. These samples were put in a 1 l beaker in which 800 ml of a 25° C. distilled water had previously been put. A rotator having a length of 3 cm was then put in the beaker. Using a magnetic stirrer, the rotary speed was then adjusted such that the film pieces were dispersed entirely in the water. For the evaluation of separability, all the samples were subject to rotation at the same speed. After 20 seconds of operation of the magnetic stirrer, the rotation was suspended. The time required until all the film pieces rose close to the surface was then measured. This procedure was conducted 10 times for each sample. The measurements excluding the maximum and minimum values were then averaged to determine a measure of separability. The shorter the time required until the film pieces rise close to the surface is, the better is separability.

(10) Formability:

During film-forming, the peelability of the unstretched sheet which had been melt-extruded from T-die from the cooling roll (mirror-finished) was evaluated according to the following criterion.

G: Easily peeled, giving no troubles in formation

F: Difficultly peeled, but giving no troubles information

P: Difficultly peeled, difficultly formed

(11) External Appearance:

The film thus formed was evaluated for external appearance according to the following criterion.

G: Uniformly stretched

P: Partly unevenly stretched, surface cracks observed

(12) Blocking Resistance (Unit: $g/10 \ cm^2$)

Two sheets of films having a width of 2 cm and a length of 15 cm were laminated over a length of 5 cm in such an arrangement that the corona-discharged surface thereof were opposed to each other. The laminate was then allowed to stand in an atmosphere of 40° C. at a load of 100 $g/cm^2$ for 24 hours. The load was then removed. The temperature of the atmosphere was then sufficiently adjusted to 23° C. Using a tensile tester, the force required to make shear peeling of sample at a rate of 200 mm/min was then measured. The smaller this value is, the better is blocking resistance.

(13) Haze:

The haze was measured according to JIS K-7105. Haze was used as a measure of transparency. The smaller this value is, the better is haze.

(14) Slipperiness:

For the evaluation of slipperiness, static friction coefficient ($\mu s$) and dynamic friction coefficient ($\mu d$) were measured according to ASTM-D1894. The smaller these values are, the better is slipperiness.

(15) Age Shrinkage Rate:

A stretched film was subjected to aging at a temperature of 40° C. for 24 hours, cut into a square having a size of 10 cm×10 cm one of the sides of which is parallel to the direction of flow of film, and then allowed to stand in a 40C Geer oven for 7 days. The film was then measured for length in the direction of flow of film and length in the crossing direction to determine age shrinkage rate. The shrinkage rate in the main shrinking direction was considered age shrinkage rate.

(16) Formation of Laminated Film (i) Formation of Unstretched Sheet

A resin composition for interlayer (I) was melt-extruded from a 75 mm single-screw extruder at a temperature of 240° C. by T-die method to a predetermined thickness. At the same time, a resin composition for surface layer (II) was melt-extruded from a 30 mm single-screw extruder and a 20 mm single-screw extruder at a temperature of 240° C. by T-die method to a predetermined thickness, respectively. The laminate was cooled and solidified over a 15° C. cooling roll to obtain an unstretched sheet having a thickness of 300 μm.

(ii) Formation of Stretched Film

The unstretched sheet thus obtained was introduced into a tenter furnace where it was then pre-heated to a lowest forming temperature for 30 seconds. At the same temperature, the sheet was then stretched crosswise at a draw ratio of 6.5 in 30 seconds. Subsequently, the sheet was annealed at a temperature of 87° C. in the same tenter furnace while being relaxed crosswise at a ratio of 7.5% for 30 seconds to obtain a film for heat-shrinkable shrink label having a draw ratio of 6 and a thickness of 50 μm.

(17) Dynamic Viscoelasticity:

The dynamic viscoelasticity was measured by means of a dynamic viscoelasticity meter (RDA-II) (produced by Rheometric Scientific Co., Ltd.).

Conditions of Preparation of Sample;

Using a mold having a size of 3 mm (thickness)×12 mm (width)×100 mm (length), a sample was prepared by heat-pressing at a temperature of 210° C. (pre-heated for 2 minutes, deaerated 30 times, pressed for 1 minute (50 kgf/cm$^2$), pressed under cooling with water).

Measuring Conditions;

Temperature: heated from −100° C. to fusion (120° C.–160° C.)

Frequency: 6.28 rad/s (1 Hz)

Step size: 3° C. interval

Soak time: 30 seconds (soak time after the settlement of temperature; apparent temperature rising rate: about 2° C./min)

Strain: 0.1%

Geometric rectangular torsion: 2.8 mm thickness×12.0 mm width×25.0 mm length

(18) Preparation of Crystalline Propylene-α-olefin Random Copolymer (i) Synthesis of racemate of dimethylsilylene bis[1-{2-methyl-4-(4-chlorophenyl)-4H-azulenyl}]zirconium dichloride (a) Synthesis of Racemi-meso Mixture To a solution of 1.84 g (9.6 mmol) of 1-bromo-4-chlorobenzene in a mixture of n-hexane (10 ml) and diethylether (10 ml) was added dropwise a solution of t-butyl lithium (1.64M) in 11.7 ml (19.2 mmol) of pentane at a temperature of −78° C. The solution thus obtained was then stirred at a temperature of −5° C. for 1.5 hours. To the solution was then added 1.2 g (8.6 mmol) of 2-methyl azulene to cause reaction. The reaction solution was then stirred for 1.5 hours while the temperature thereof being gradually returned to room temperature. Thereafter, the reaction solution was cooled to 0° C. To the reaction solution was then added 15 μl (0.19 mmol) of 1-methylimidazole. To the reaction solution was then added 0.52 ml (4.3 mmol) of dichlorodimethyl silane. The reaction solution was then stirred at room temperature for 1.5 hours. To the reaction solution was then added diluted hydrochloric acid to suspend the reaction. The organic phase thus separated was then concentrated under reduced pressure. To the organic phase thus concentrated was then added dichloromethane. The organic phase was then dried over magnesium sulfate. The solvent was then distilled off under reduced pressure. The residue was then purified through silica gel column chromatography to obtain 2.1 g of an amorphous solid.

Subsequently, 1.27 g of the foregoing reaction product was dissolved in 15 ml of diethyl ether. To the solution was then added dropwise 2.8 ml (4.5 mmol) of a 1.66 Mn-hexane solution of n-butyl lithium at a temperature of −78° C. After the termination of dropwise addition, the reaction solution was stirred for 12 hours while the temperature thereof being gradually returned to room temperature. The solvent was then distilled off under reduced pressure. To the residue was then added 5 ml of a 40:1 mixture of toluene and diethyl ether. The solution was then cooled to −78° C. To the solution was then added 0.53 g (2.3 mmol) of zirconium tetrachloride. The temperature of the solution was immediately returned to room temperature at which the solution was then allowed to undergo reaction with stirring for 4 hours. The reaction solution thus obtained was then filtered through Celite. The solid matter thus recovered was washed with 3 ml of toluene, and then collected. The solid matter thus collected was then extracted with dichloromethane. The solvent was then distilled off from the extract to obtain 906 mg (yield: 56%) of a racemi-meso mixture of dimethylsilylene bis[1-{2-methyl-4-(4-chlorophenyl)-4H-azulenyl}] zirconium dichloride.

(b) Purification of Racemate 900 mg of the foregoing racemi-meso mixture was dissolved in 20 ml of dichloromethane. The solution thus obtained was then irradiated with light from a 100 W high voltage mercury vapor lamp for 40 minutes to raise the proportion of racemate. Thereafter, the insoluble matters were filtered off. The resulting filtrate was then concentrated to dryness. Subsequently, the resulting solid component was stirred with 22 ml of toluene, and then allowed to stand. The resulting supernatant liquid was then removed. This purification procedure was conducted four times. The residual solid component was then dried to obtain 275 mg of a racemate of dimethylsilylene bis[1-{2-methyl-4-(4-chlorophenyl)-4H-azulenyl}]zirconium dichloride.

(ii) Chemical Treatment of Clay Mineral 200.03 g of a commercial monmorillonite (Kunipia, produced by Kunimine Industry Corp.) was dispersed in an aqueous solution obtained by mixing 218.1 g of sulfuric acid (96%) and 130.4 g of magnesium sulfate with 909 ml of desalted water. The dispersion was then stirred at a temperature of 100° C. for 2 hours. An aqueous slurry of monmorillonite having a solid content of 12% was then prepared and spray-granulated by a spray drier to obtain a particulate material. Thereafter, the particulate material was dried at a temperature of 200° C. and reduced pressure for 2 hours.

(iii) Preparation of Catalyst Component

The air in a 1 l capacity agitated autoclave was thoroughly replaced by propylene. Into the autoclave was then introduced 230 ml of dehydrated and deoxidized heptane. The system temperature was then kept at 40° C. To the material was then added 10 g of a toluene slurry of chemically-treated clay. To the material were then added 0.15 mmol of the racemate of dimethylsilylene bis[1-{2-methyl-4-(4- chlorophenyl)-4H-azulenyl}]zirconium dichloride and 1.5 mmol of triisobutyl aluminum which had been mixed in the presence of toluene in a separate container. Propylene was then introduced into the system at a rate of 10 g/hr. Thereafter, polymerization was allowed to continue for 120 minutes. The reaction product was then subjected to removal of solvent and drying in an atmosphere of nitrogen to obtain a solid catalyst component. The solid catalyst component thus obtained contained a polypropylene in an amount of 1.9 g per g of solid component.

(iv) Polymerization

The air in a 200 l capacity agitated autoclave was thoroughly replaced by propylene. Into the autoclave was then introduced 45 kg of sufficiently dehydrated liquefied propylene. To the propylene were then added 500 ml (0.12 mol) of an n-heptane solution of triisobutyl aluminum, 2.0 kg of ethylene and 3.5 l (as calculated in terms of volume in standard state) of hydrogen. The internal temperature of the autoclave was kept at 30° C. Subsequently, 1.45 g of the foregoing solid catalyst component was pressed into the autoclave to initiate polymerization. The polymerization system was then heated to a temperature of 70° C. in 30 minutes. This temperature was then kept for 1 hour. To the reaction solution was then added 100 ml of ethanol to suspend the reaction. The residual gas was then purged to obtain 13.7 kg of a propylene-ethylene random copolymer (PP(1)) having the following physical properties. The foregoing polymerization procedure was repeated until the required amount of product was obtained as a sample.

MFR: 2.58 g/10 min; ethylene content: 3.42% by weight; $T_p$: 122.7° C.; $T_{50}$: 113° C.

EXAMPLE 1

Preparation of Resin Composition and Formation of Film

To 100 parts by weight of a resin composition comprising 80% by weight of PP(1) powder obtained as mentioned above and 20% by weight of Alcon P125 (produced by Arakawa Chemical Industries, Ltd.; softening temperature: 125° C.) were added 0.05 parts by weight of calcium stearate, 0.1 parts by weight of Irganox 1010, 0.1 parts of Irgafos 168, and 0.1 parts by weight of a synthetic silica having an average particle diameter of 2.5 μm as an anti-blocking agent. These components were then mixed by a Henschel mixer. The mixture was then granulated by a 50 mm single-screw extruder to obtain a pelletized resin composition. The pelletized resin composition was then subjected to processing as previously mentioned to form a film for shrink label. The lowest forming pre-heating temperature during the formation of the film was 60° C.

The results of evaluation of the film thus obtained are set forth in Table 1.

EXAMPLE 2

A film for shrink label was formed in the same manner as in Example 1 except that as an alicyclic hydrocarbon resin there was used Alcon P140 (softening point: 140° C.; produced by Arakawa Chemical Industries, Ltd.). The lowest forming pre-heating temperature during the formation of the film was 60° C.

The results of evaluation of the film thus obtained are set forth in Table 1.

EXAMPLE 3

A film for shrink label was formed in the same manner as in Example 1 except that as an alicyclic hydrocarbon resin there was used Escorez 228F (produced by Tonex Co., Ltd.; softening point: 137° C.). The lowest forming pre-heating temperature during the formation of the film was 60° C.

The results of evaluation of the film thus obtained are set forth in Table 1.

EXAMPLE 4

To 100 parts by weight of a resin composition comprising 75% by weight of PP(1) powder and 25% by weight of Escorez 5320 HC (produced by Tonex Co., Ltd.; softening point: 125° C.) were added 0.05 parts by weight of calcium stearate, 0.1 parts by weight of Irganox 1010, 0.1 parts of Irgafos 168, and 0.1 parts by weight of a synthetic silica having an average particle diameter of 2.5 μm as an anti-blocking agent. These components were then mixed by a Henschel mixer. The mixture was then granulated by a 50 mm single-screw extruder to obtain a pelletized resin composition. The pelletized resin composition was then subjected to processing as previously mentioned to form a film for shrink label. The lowest forming pre-heating temperature during the formation of the film was 60° C.

The results of evaluation of the film thus obtained are set forth in Table 1.

EXAMPLE 5

To 100 parts by weight of a resin composition comprising 70% by weight of PP(1) powder and 30% by weight of Alcon P140 (produced by Arakawa Chemical Industries, Ltd.; softening temperature: 140° C.) were added 0.05 parts by weight of calcium stearate, 0.1 parts by weight of Irganox1010, 0.1 parts of Irgafos 168, and 0.1 parts by weight of a synthetic silica having an average particle diameter of 2.5 μm as an anti-blocking agent. These components were then mixed by a Henschel mixer. The mixture was then granulated by a 50 mm single-screw extruder to obtain a pelletized resin composition. The pelletized resin composition was then subjected to processing as previously mentioned to form a film for shrink label. The lowest forming pre-heating temperature during the formation of the film was 60° C.

The results of evaluation of the film thus obtained are set forth in Table 1.

COMPARATIVE EXAMPLE 1

A propylene-ethylene random copolymer (PP(2)) was prepared in the presence of an ordinary Ziegler-Natta catalyst. The propylene-ethylene random copolymer thus obtained had the following physical properties.

MFR: 2.30 g/10 min; ethylene content: 3.60% by weight; $T^p$: 138.3° C.; $T_{50}$: 130° C.

To 100 parts by weight of a resin composition comprising 80% by weight of PP(2) powder thus obtained and 20% by weight of Alcon P140 (produced by Arakawa Chemical Industries, Ltd.; softening temperature: 140° C.) were added 0.05 parts by weight of calcium stearate, 0.1 parts by weight of Irganox 1010, 0.1 parts of Irgafos 168, and 0.1 parts by weight of a synthetic silica having an average particle diameter of 2.5 μm as an anti-blocking agent. These components were then mixed by a Henschel mixer. The mixture was then granulated by a 50 mm single-screw extruder to obtain a pelletized resin composition. The pelletized resin composition was then subjected to processing as previously mentioned to form a film for shrink label. The lowest forming pre-heating temperature during the formation of the film was 80° C.

The results of evaluation of the film thus obtained are set forth in Table 1.

Since the crystalline propylene-ethylene random copolymer used had a high $T_{50}$ value, the resulting film exhibited a drastically lowered heat-shrinkability.

COMPARATIVE EXAMPLE 2

A film for shrink label was formed in the same manner as in Example 1 except that as an alicyclic hydrocarbon resin there was used Escorez 5300HC (produced by Tonex Co., Ltd.; softening point: 105° C.). The lowest forming pre-heating temperature during the formation of the film was 60° C.

The results of evaluation of the film thus obtained are set forth in Table 1.

Since the alicyclic hydrocarbon resin had a low softening point, the resulting film was sticky.

was then granulated by a 50 mm single-screw extruder to obtain a pelletized resin composition for interlayer (I).

To 100 parts by weight of PP(1) powder were added 0.05 parts by weight of calcium stearate, 0.1 parts by weight of Irganox 1010, 0.1 parts of Irgafos 168, and 0.2 parts by weight of a synthetic silica having an average particle diameter of 2.5 μm as an anti-blocking agent. These components were then mixed by a Henschel mixer. The mixture was then granulated by a 50 mm single-screw extruder to obtain a pelletized resin composition for surface layer (II).

The pelletized resin compositions thus obtained were then subjected to processing as previously mentioned to form a laminated film for shrink label. The total thickness of the laminated film was 50 μm. The thickness of the interlayer (I) was 44 μm. The thickness of both the surface layers (II) were each 3 μm.

The lowest forming pre-heating temperature during the formation of the film was 60° C.

TABLE 1

| | | | Example 1 | Example 2 | Example 3 | Example 4 | Example 5 | Comparative Example 1 | Comparative Example 2 |
|---|---|---|---|---|---|---|---|---|---|
| Resin composition | PP(1) content | wt-% | 80 | 80 | 80 | 75 | 70 | — | 80 |
| | PP(2) content | wt-% | — | — | — | — | — | 80 | — |
| | Kind of alicyclic hydrocarbon resin | — | Alcon P125 | Alcon P140 | Escorez 228F | Escorez 5320HC | Alcon P140 | Alcon P140 | Escorez 5300HC |
| | Softeninq point of alicyclic hydrocarbon resin | ° C. | 125 | 140 | 137 | 125 | 140 | 140 | 105 |
| | Content of alicyclic hydrocarbon resin | wt-% | 20 | 20 | 20 | 25 | 30 | 20 | 20 |
| Forming conditions | Pre-heating temperature | ° C. | 60 | 60 | 60 | 60 | 60 | 80 | 80 |
| | Draw ratio TD* | | 6 | 6 | 6 | 6 | 6 | 6 | 6 |
| Heat-shrink ability | 80° C. | % | 19.7 | 20.5 | 21.5 | 23.2 | 27.0 | 10.7 | 19.0 |
| | 90° C. | % | 32.0 | 33.0 | 32.5 | 38.7 | 45.0 | 20.0 | 30.0 |
| | 100° C. | % | 52.2 | 54.2 | 52.5 | 55.0 | 60.5 | 30.8 | 50.0 |
| Stickiness of film | | — | No | No | No | No | No | No | Yes |

*Draw ratio TD indicates draw ratio at the outlet of the tenter.

| | PP-1 (metallocene) | PP-2 (Ziegler) | Claim 1 (physical properties of composition) |
|---|---|---|---|
| MFR | 2.58 | 2.30 | (1) 0.5–10 |
| Ethylene | 3.42% | 3.60 | — |
| $T_p$ | 122.7° C. | 138.3° C. | (2) 100–145° C. |
| $T_{50}$ | 113° C. | 130° C. | (3) not higher than 125° C. Content: 50–95% Hydrocarbon resin Softening temperature: not lower than 110° C. Content: 5–95% |

EXAMPLE 6

To 100 parts by weight of a resin composition comprising 75% by weight of PP(1) powder obtained as mentioned above and 25% by weight of Escorez E5320 (produced by Tonex Co., Ltd.; softening temperature: 125° C.) were added 0.05 parts by weight of calcium stearate, 0.1 parts by weight of Irganox 1010, and 0.1 parts of Irgafos 168. These components were then mixed by a Henschel mixer. The mixture The results of evaluation of the film thus obtained are set forth in Table 2.

EXAMPLE 7

A laminated film for shrink label was formed in the same manner as in Example 6 except that as the base PP of resin composition for surface layer (II) there was used PP(2).

The lowest forming pre-heating temperature during the formation of the film was 60° C.

The results of evaluation of the film thus obtained are set forth in Table 2.

COMPARATIVE EXAMPLE 3

A laminated film for shrink label was formed in the same manner as in Example 6 except that as the resin composition for surface layer (II) there was the same resin composition as used in the interlayer (I).

The lowest forming pre-heating temperature during the formation of the film was 60° C.

The results of evaluation of the film thus obtained are set forth in Table 2. The resulting film exhibited a deteriorated formability as well as deteriorated blocking resistance and slipperiness as compared with the examples.

COMPARATIVE EXAMPLE 4

A laminated film for shrink label was formed in the same manner as in Example 6 except that the base PP of resin composition for interlayer (I) was changed to PP(2) and the base PP of resin composition for surface layer (II) was changed to PP(2).

The lowest forming pre-heating temperature during the formation of the film was 80° C.

The results of evaluation of the film thus obtained are set forth in Table 2. The resulting film exhibited deteriorated wrapping properties as compared with the examples.

COMPARATIVE EXAMPLE 5

A laminated film for shrink label was formed in the same manner as in Example 6 except that no anti-blocking agent was incorporated in the resin composition for surface layer (II) The lowest forming pre-heating temperature during the formation of the film was 60° C.

The results of evaluation of the film thus obtained are set forth in Table 2. The resulting film exhibited deteriorated blocking resistance and slipperiness as compared with the examples.

COMPARATIVE EXAMPLE 6

To 100 parts by weight of a resin composition comprising 50% by weight of PP(2) powder and 50% by weight of Escorez E5320 (produced by Tonex Co., Ltd.; softening temperature: 125° C.) were added 0.05 parts by weight of calcium stearate, 0.1 parts by weight of Irganox 1010, and 0.1 parts of Irgafos 168. These components were then mixed by a Henschel mixer. The mixture was then granulated by a 50 mm single-screw extruder to obtain a pelletized resin composition for interlayer (I).

To 100 parts by weight of PP(2) powder were added 0.05 parts by weight of calcium stearate, 0.1 parts by weight of Irganox 1010, 0.1 parts of Irgafos 168, and 0.2 parts by weight of a synthetic silica having an average particle diameter of 2.5 $\mu$m as an anti-blocking agent. These components were then mixed by a Henschel mixer. The mixture was then granulated by a 50 mm single-screw extruder to obtain a pelletized resin composition for surface layer (II).

The pelletized resin compositions thus obtained were then subjected to processing as previously mentioned to form a laminated film for shrink label. The total thickness of the laminated film was 50 $\mu$m. The thickness of the interlayer (I) was 44 $\mu$m. The thickness of both the surface layers (II) were each 3 $\mu$m.

The lowest forming pre-heating temperature during the formation of the film was 60° C.

The results of evaluation of the film thus obtained are set forth in Table 2. The resulting film exhibited a raised specific gravity, a slightly deteriorated formability and a deteriorated separability as compared with the examples.

COMPARATIVE EXAMPLE 7

A laminated film for shrink label was formed in the same manner as in Example 6 except that the thickness of the interlayer (I) was changed to 20 $\mu$m and the thickness of the surface layers (II) were each changed to 15 $\mu$m.

The lowest forming pre-heating temperature during the formation of the film was 70° C.

The results of evaluation of the film thus obtained are set forth in Table 2. The resulting film exhibited a deteriorated external appearance as well as deteriorated wrapping properties as compared with the examples.

TABLE 2

| Properties evaluated | Unit | Example 6 | Example 7 | Comparative Example 3 | Comparative Example 4 | Comparative Example 5 | Comparative Example 6 | Comparative Example 7 |
|---|---|---|---|---|---|---|---|---|
| Specific gravity of film (d) | — | 0.925 | 0.926 | 0.930 | 0.930 | 0.927 | 0.970 | 0.910 |
| Relationship (1): $S_{80}$ >251d − 215 | % | 17.2 | 17.4 | 18.4 | 18.4 | 17.7 | 28.5 | 13.4 |
| Relationship (2): $S_{90}$ >531d − 462 | % | 29.2 | 29.7 | 31.8 | 31.8 | 30.2 | 53.1 | 21.2 |
| Relationship (3): $S_{100}$ > 627d − 541 | % | 39.0 | 39.6 | 42.1 | 42.1 | 40.2 | 67.2 | 29.6 |
| $S_{80}$ (measured) | % | 25.4 | 22.2 | 25.3 | 13.0 | 24.8 | 20.0 | 13.0 |
| $S_{90}$ (measured) | % | 42.8 | 39.5 | 43.3 | 21.0 | 43.3 | 35.2 | 27.0 |
| $S_{100}$ (measured) | % | 58.0 | 55.0 | 57.0 | 35.0 | 57.5 | 50.0 | 45.3 |
| Haze | — | 3.3 | 4.7 | 2.5 | 5.2 | 2.5 | 5.0 | 7.5 |
| Slipperiness | | | | | | | | |
| $\mu s$ | — | 0.50 | 0.50 | ≧1.0 | 0.51 | ≧1.0 | 0.48 | 0.45 |
| $\mu d$ | — | 0.44 | 0.42 | ≧1.0 | 0.44 | ≧1.0 | 0.45 | 0.40 |
| Blocking resistance | g/10 cm$^2$ | 600 | 570 | 2,800 | 570 | 1,850 | 2,030 | 450 |
| Age shrinkage rate | % | 1.1 | 1.0 | 1.3 | 1.5 | 1.0 | 1.2 | 2.0 |
| Formability | — | G | G | P | G | G | F | G |
| External appearance | — | G | G | G | G | G | G | P |
| Wrapping properties | — | Good | Good | Good | Poor | Good | Good | Poor |
| Separability | sec. | 23.4 | 24.0 | 25.0 | 26.6 | 24.3 | 42.0 | 14.5 |

Relationship (1): $S_{80}$ > 251d − 215
Relationship (2): $S_{90}$ > 531d − 462
Relationship (3): $S_{100}$ > 627d − 541

EXAMPLE 8

To 100 parts by weight of a resin composition comprising 75% by weight of PP(1) powder obtained as mentioned above and 25% by weight of Escorez E5320 (produced by Tonex Co., Ltd.; softening temperature: 125° C.) were added 0.05 parts by weight of calcium stearate, 0.1 parts by weight of Irganox 1010, and 0.1 parts of Irgafos 168. These components were then mixed by a Henschel mixer. The mixture was then granulated by a 50 mm single-screw extruder to obtain a pelletized resin composition for interlayer (I).

During the measurement of dynamic viscoelasticity of the resin composition thus obtained, the peak of tan δ measured at a frequency of 1 Hz and a strain of 1% was observed at a temperature of 50° C. The peak value of tan δ was 0.254.

To 100 parts by weight of PP(1) powder were added 0.05 parts by weight of calcium stearate, 0.1 parts by weight of Irganox 1010, 0.1 parts of Irgafos 168, and 0.2 parts by weight of a synthetic silica having an average particle diameter of 2.5 μm as an anti-blocking agent. These components were then mixed by a Henschel mixer. The mixture was then granulated by a 50 mm single-screw extruder to obtain a pelletized resin composition for surface layer (II).

The pelletized resin compositions thus obtained were then subjected to processing as previously mentioned to form a laminated film for shrink label. The total thickness of the laminated film was 50 μm. The thickness of the interlayer (I) was 44 μm. The thickness of both the surface layers (II) were each 3 μm.

The lowest forming pre-heating temperature during the formation of the film was 60° C.

The results of evaluation of the film thus obtained are set forth in Table 3.

EXAMPLE 9

A laminated film for shrink label was formed in the same manner as in Example 8 except that Escorez E5320 used as the alicyclic hydrocarbon resin for interlayer (I) was replaced by Alcon P140 (softening point: 140° C., produced by Arakawa Chemical Industries, Ltd.).

During the measurement of dynamic viscoelasticity of the resin composition thus obtained, the peak of tan 67 measured at a frequency of 1 Hz and a strain of 1% was observed at a temperature of 72° C. The peak value of tan δ was 0.257.

The lowest forming pre-heating temperature during the formation of the film was 60° C.

The results of evaluation of the film thus obtained are set forth in Table 3.

EXAMPLE 10

To 100 parts by weight of a resin composition comprising 90% by weight of PP(1) powder and 10% by weight of Escorez E5320 (produced by Tonex Co., Ltd.; softening temperature: 125° C.) were added 0.05 parts by weight of calcium stearate, 0.1 parts by weight of Irganox 1010, and 0.1 parts of Irgafos 168. These components were then mixed by a Henschel mixer. The mixture was then granulated by a 50 mm single-screw extruder to obtain a pelletized resin composition for interlayer (I).

During the measurement of dynamic viscoelasticity of the resin composition thus obtained, the peak of tan δ measured at a frequency of 1 Hz and a strain of 1% was observed at a temperature of 48° C. The peak value of tan δ was 0.170.

To 100 parts by weight of PP(1) powder were added 0.05 parts by weight of calcium stearate, 0.1 parts by weight of Irganox 1010, 0.1 parts of Irgafos 168, and 0.2 parts by weight of a synthetic silica having an average particle diameter of 2.5 μm as an anti-blocking agent. These components were then mixed by a Henschel mixer. The mixture was then granulated by a 50 mm single-screw extruder to obtain a pelletized resin composition for surface layer (II).

The pelletized resin compositions thus obtained were then subjected to processing as previously mentioned to form a laminated film for shrink label. The total thickness of the laminated film was 50 μm. The thickness of the interlayer (I) was 44 μm. The thickness of both the surface layers (II) were each 3 μm.

The lowest forming pre-heating temperature during the formation of the film was 70° C.

The results of evaluation of the film thus obtained are set forth in Table 3.

COMPARATIVE EXAMPLE 8

To 100 parts by weight of PP(1) powder were added 0.05 parts by weight of calcium stearate, 0.1 parts by weight of Irganox 1010, and 0.1 parts of Irgafos 168. These components were then mixed by a Henschel mixer. The mixture was then granulated by a 50 mm single-screw extruder to obtain a pelletized resin composition for interlayer (I).

During the measurement of dynamic viscoelasticity of the resin composition thus obtained, there were observed two peaks of tan δ measured at a frequency of 1 Hz and a strain of 1% at a temperature of 0° C. and 48° C., respectively. One of the peak values of tan δ was 0.130 while the other was 0.093.

To 100 parts by weight of PP(1) powder were added 0.05 parts by weight of calcium stearate, 0.1 parts by weight of Irganox 1010, 0.1 parts of Irgafos 168, and 0.2 parts by weight of a synthetic silica having an average particle diameter of 2.5 μm as an anti-blocking agent. These components were then mixed by a Henschel mixer. The mixture was then granulated by a 50 mm single-screw extruder to obtain a pelletized resin composition for surface layer (II).

The pelletized resin compositions thus obtained were then subjected to processing as previously mentioned to form a laminated film for shrink label. The total thickness of the laminated film was 50 μm. The thickness of the interlayer (I) was 44 μm. The thickness of both the surface layers (II) were each 3 μm.

The lowest forming pre-heating temperature during the formation of the film was 85° C.

The results of evaluation of the film thus obtained are set forth in Table 3. The resulting film exhibited a deteriorated heat-shrinkability as well as deteriorated wrapping properties as compared with the examples.

TABLE 3

| Properties evaluated | Unit | Example 8 | Example 9 | Example 10 | Comparative Example 8 |
| --- | --- | --- | --- | --- | --- |
| Specific gravity of film (d) | — | 0.927 | 0.915 | 0.909 | 0.897 |
| Resin for interlayer (I) | | | | | |
| Propylene-α-olefin random copolymer | wt-% | PP(1) 75 | PP(1) 75 | PP(1) 90 | PP(1) 100 |
| Alicyclic hydrocarbon resin | wt-% | E5320 | P140 | E5320 | — |
| | — | 25 | 25 | 10 | 0 |
| Tan δ peak temperature | ° C. | 50 | 72 | 48 | 0 |

TABLE 3-continued

| Properties evaluated | Unit | Example 8 | Example 9 | Example 10 | Comparative Example 8 |
|---|---|---|---|---|---|
| (1) | | | | | |
| Tan δ peak value (1) | — | 0.254 | 0.257 | 0.170 | 0.130 |
| Tan δ peak temperature (2) | °C. | — | — | — | 48 |
| Tan δ peak value (2) | — | — | — | — | 0.093 |
| Relationship (1): $S_{80} > 251d - 215$ | % | 17.7 | 14.7 | 13.2 | 10.1 |
| Relationship (2): $S_{90} > 531d - 462$ | % | 30.2 | 23.9 | 20.7 | 14.3 |
| Relationship (3): $S_{100} > 627d - 541$ | % | 40.2 | 32.2 | 28.9 | 21.4 |
| $S_{80}$ (measured) | % | 25.4 | 25.0 | 13.4 | 9.0 |
| $S_{90}$ (measured) | % | 42.8 | 44.3 | 29.3 | 21.7 |
| $S_{100}$ (measured) | % | 58.0 | 55.0 | 44.4 | 35.7 |
| Age shrinkage rate | % | 1.1 | 1.0 | 1.3 | 1.2 |
| External appearance | — | G | G | G | G |
| Wrapping properties | — | Good | Good | Good | Poor |

Relationship (1): $S_{80} > 251d - 215$
Relationship (2): $S_{90} > 531d - 462$
Relationship (3): $S_{100} > 627d - 541$ The film for heat-shrinkable polypropylene-based shrink label of the invention exhibits an improvement in heat shrinkability, particularly at low temperatures, a lowered specific gravity that provides well-balanced wrapping properties and recycling efficiency, and well-balanced formability, transparency, blocking resistance and slipperiness and thus can be used as a shrink label for container.

The entire disclosure of each and every foreign patent application from which the benefit of foreign priority has been claimed in the present application is incorporated herein by reference, as if fully set forth herein.

What is claimed is:

1. A film for heat-shrinkable polypropylene shrink label comprising a resin composition which comprises from 50 to 95% by weight of a crystalline propylene-α-olefin random copolymer mainly comprising propylene, the copolymer satisfying the following requirements (1) to (3); and from 5 to 50% by weight of an alicyclic hydrocarbon resin having a softening temperature of 110° C. to 140° C.:

Requirement (1): The copolymer exhibits a melt flow rate of from 0.5 to 10 g/10 min at a temperature of 230° C. and a load of 2.16 kg;

Requirement (2): The copolymer exhibits a main fusion peak temperature (Tp) of from 100° C. to 140° C. as determined by means of a differential scanning calorimeter (DSC); and Requirement (3): The copolymer exhibits $T_{50}$ of not higher than 125° C. with the proviso that $T_{50}$ is a temperature (° C.) at which an amount of heat of fusion is 50% of ΔHm wherein ΔHm is a total amount of heat of fusion of the copolymer as determined by DSC, wherein in a dynamic viscoelasticity measurement, at least one peak of loss tangent (tan δ) measured at a frequency of 1 Hz and a strain of 0.1% is observed at the range of from 30° C. to 100° C., and a peak value thereof is not smaller than 0.10, in which the film has been stretched at least monoaxially at a draw ratio of not smaller than 2, and shrinks in the main shrinking direction at a shrinkage rate satisfying the following relationships (1) to (3), exhibits a specific gravity of not greater than 0.95, and shrinks at a shrinkage rate of less than 3% at a temperature of 40° C. in 7 days:

$S_{80} > 251d - 215$  Relationship (1):

$S_{90} > 531d - 462$  Relationship (2):

$S_{100} > 627d - 541$  Relationship (3):

wherein $S_{80}$, $S_{90}$ and $S_{100}$ are shrinkage rates (%) in the main shrinking direction determined when dipped in a hot water bath at 80° C., 90° C. and 100° C., respectively, for 10 seconds; and d is the specific gravity of the film for shrink label.

2. A laminated film for shrink label, which comprises a layer (I) comprising a resin composition which comprises from 50 to 95% by weight of a crystalline propylene-α-olefin random copolymer mainly comprising propylene, the copolymer satisfying the following requirements (1) to (3); and from 5 to 50% by weight of an alicyclic hydrocarbon resin having a softening temperature of 110° C. to 140° C.:

Requirement (1): The copolymer exhibits a melt flow rate of from 0.5 to 10 g/10 min at a temperature of 230° C. and a load of 2.16 kg;

Requirement (2): The copolymer exhibits a main fusion peak temperature (Tp) of from 100° C. to 140° C. as determined by means of a differential scanning calorimeter (DSC); and Requirement (3): The copolymer exhibits $T_{50}$ of not higher than 125° C. with the proviso that $T_{50}$ is a temperature (° C.) at which an amount of heat of fusion is 50% of ΔHm wherein ΔHm is a total amount of heat of fusion of the copolymer as determined by DSC, wherein in a dynamic viscoelasticity measurement, at least one peak of loss tangent (tan δ) measured at a frequency of 1 Hz and a strain of 0.1% is observed at the range of from 30° C. to 100° C., and a peak value thereof is not smaller than 0.10, and a surface layer (II), wherein the sum number of the layer (I) and the surface layer (II) is not smaller than 2; and the laminated film shrinks in the main shrinking direction at a shrinkage rate satisfying the following relationships (1) to (3), exhibits a specific gravity of not greater than 0.94, and shrinks at a shrinkage rate of less than 3% at a temperature of 40° C. in 7 days:

$S_{80} > 251d - 215$  Relationship (1):

$S_{90} > 531d - 462$  Relationship (2):

$S_{100} > 627d - 541$  Relationship (3):

wherein $S_{80}$, $S_{90}$ and $S_{100}$ are shrinkage rates (%) in the main shrinking direction determined when dipped in a hot water bath at 80° C., 90° C. and 100° C., respectively, for 10 seconds; and d is the specific gravity of the laminated film for shrink label.

3. The film for heat-shrinkable polypropylene shrink label according to claim 1, wherein the crystalline propylene-α-olefin random copolymer is a copolymer obtained by polymerization in the presence of a metallocene catalyst.

4. The laminated film for shrink label according to claim 2, wherein the surface layer (II) is laminated on at least one side of the layer (I), the laminated film having been stretched at least monoaxially at a draw ratio of not smaller than 2, wherein the surface layer (II) laminated on at least one side of the layer (I) has a total thickness of 1 to 50% of the total film thickness, and the surface layer (II) comprises a resin composition comprising a crystalline propylene-α-olefin random copolymer (2) mainly comprising a propylene, the crystalline propylene-α-olefin random copolymer (2) satisfying the following requirements (d) and (e);

Requirement (d): The resin composition exhibits a melt flow rate of from 0.5 to 50 g/10 min at a temperature of 230° C. and a load of 2.16 kg; and Requirement (e): The resin composition exhibits a main fusion peak temperature (Tp) of from 100° C. to 150° C. as determined by means of a differential scanning calorimeter (DSC).

5. The laminated film for heat-shrinkable polypropylene shrink label according to claim 4, wherein the surface layer (II) comprises a resin composition comprising an anti-blocking agent having a volume-average particle diameter of from 1.0 to 10 μm in an amount of from 0.05 to 1.0 parts by weight based on 100 parts by weight of the crystalline propylene-α-olefin random copolymer (2).

6. The laminated film for heat-shrinkable polypropylene shrink label according to claim 4, wherein the crystalline propylene-α-olefin random copolymer (2) in the surface layer is a propylene-ethylene random copolymer.

7. A heat-shrinkable label having a specific gravity of less 1.0, which comprises a film for shrink label according to claim 1.

8. A heat-shrinkable label having a specific gravity of less than 1.0, which comprises a laminated film for shrink label according to claim 2.

9. A heat-shrinkable label having a specific gravity of less than 1.0, which comprises a laminated film for shrink label according to claim 4.

10. A container having a heat-shrinkable label according to claim 7 attached thereto.

11. A container having a heat-shrinkable label according to claim 8 attached thereto.

12. A container having a heat-shrinkable label according to claim 9 attached thereto.

* * * * *